(12) United States Patent
Kudo et al.

(10) Patent No.: US 9,184,809 B2
(45) Date of Patent: Nov. 10, 2015

(54) WIRELESS COMMUNICATION METHOD AND ACCESS POINT APPARATUS

(71) Applicant: NIPPON TELEGRAPH AND TELEPHONE CORPORATION, Tokyo (JP)

(72) Inventors: Riichi Kudo, Yokosuka (JP); Tomoki Murakami, Yokosuka (JP); Koichi Ishihara, Yokosuka (JP); Takeo Ichikawa, Yokosuka (JP); Yusuke Asai, Yokosuka (JP); Tomoaki Kumagai, Yokosuka (JP); Masato Mizoguchi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 50 days.

(21) Appl. No.: 14/235,848

(22) PCT Filed: Sep. 18, 2012

(86) PCT No.: PCT/JP2012/073853
§ 371 (c)(1),
(2) Date: Jan. 29, 2014

(87) PCT Pub. No.: WO2013/039248
PCT Pub. Date: Mar. 21, 2013

(65) Prior Publication Data
US 2014/0204890 A1   Jul. 24, 2014

(30) Foreign Application Priority Data

Sep. 16, 2011   (JP) ................................. 2011-203024

(51) Int. Cl.
*H04B 7/04* (2006.01)
*H04B 7/06* (2006.01)
*H04L 25/02* (2006.01)

(52) U.S. Cl.
CPC ............ *H04B 7/0417* (2013.01); *H04B 7/0452* (2013.01); *H04B 7/0634* (2013.01); *H04L 25/0204* (2013.01); *H04L 25/0226* (2013.01)

(58) Field of Classification Search
CPC .. H04B 7/0417; H04B 7/0634; H04B 7/0452; H04L 25/0204; H04L 25/0226
USPC .................................................. 370/328, 329
See application file for complete search history.

(56) References Cited

U.S. PATENT DOCUMENTS

2013/0244586 A1 * 9/2013 Nabar et al. .................... 455/69

FOREIGN PATENT DOCUMENTS

| JP | 2005-323216 | 11/2005 |
| JP | 2005-323218 | 11/2005 |

(Continued)

OTHER PUBLICATIONS

IEEE, "Proposed specification framework for TGac," doc.: IEEE 802.11-09/0992r21, Jan. 2011.

(Continued)

*Primary Examiner* — Kwang B Yao
*Assistant Examiner* — Syed M Bokhari
(74) *Attorney, Agent, or Firm* — Harness, Dickey & Pierce, P.L.C.

(57) ABSTRACT

The number of training signals for channel estimation is reduced. A wireless communication method includes: a step of reading, by an access point apparatus, stored training weights for a station which performs channel estimation; a step of generating, by the access point apparatus, a weight training symbol by multiplying the training weights by a training symbol and transmitting the generated weight training symbol; a step of estimating, by a station apparatus, weight channel information from the received weight training symbol; a step of transmitting, by the station apparatus, the weight channel information to the access point apparatus; a step of calculating, by the access point apparatus, transmission weights using the received weight channel information and the stored training weights; a step of transmitting, by the access point apparatus, a data signal in accordance with the transmission weights; and a step of calculating and storing, by the access point apparatus, new training weights using the weight channel information and the stored training weights.

10 Claims, 7 Drawing Sheets

(56) References Cited

FOREIGN PATENT DOCUMENTS

| | | |
|---|---|---|
| JP | 2006-222742 | 8/2006 |
| JP | 2007-306646 | 11/2007 |
| JP | 2008-545293 | 12/2008 |
| JP | 2009-540688 | 11/2009 |
| JP | 2009-543471 | 12/2009 |
| WO | WO-2006/124419 | 11/2006 |
| WO | WO-2007/143472 | 12/2007 |
| WO | WO-2008/002972 | 1/2008 |

OTHER PUBLICATIONS

Riichi Kudo et al., 'Beamforming technique using dimension reduction weight in next generation WLANs', Proceedings of the 2011 IEICE General Conference, B-5-126, IEICE, Feb. 28, 2011, p. 512, chapter 2.

International Search Report for PCT/JP2012/073853, ISA/JP, mailed Dec. 18, 2012.

* cited by examiner ns of each station before the access point 1 transmits data.

WIRELESS COMMUNICATION METHOD AND ACCESS POINT APPARATUS

TECHNICAL FIELD

The present invention relates to a channel information acquisition method and beamforming technology in a communication system based on beams subjected to directivity control.

Priority is claimed on Japanese Patent Application No. 2011-203024, filed Sep. 16, 2011, the content of which is incorporated herein by reference.

BACKGROUND ART

In recent years, as high-speed wireless access systems using a band of 2.4 GHz or 5 GHz, the spread of systems of the Institute of Electrical and Electronics Engineers (IEEE) 802.11g standard, the IEEE 802.11a standard, and so on has been remarkable. In these systems, a physical layer transmission speed of up to 54 Mbps is achieved using an orthogonal frequency division multiplexing (OFDM) modulation scheme, which is technology used to stabilize the performance in a multipath fading environment.

However, the transmission speed referred to here is a transmission speed on a physical layer. Because the transmission efficiency of a medium access control (MAC) layer is actually about 50% to 70%, an upper limit of an actual throughput is about 30 Mbps and its performance is further degraded if the number of communication partners requiring information increases. On the other hand, in the field of wired local area networks (LANs), the provision of a high-speed link of 100 Mbps is widespread as a result of the spread of fiber to the home (FTTH) using optical fibers in individual homes such as a 100 Base-T interface of Ethernet (registered trademark). A further increase in a transmission speed is also required in the field of the wireless LANs.

As technology therefor, multiple-input multiple-output (MIMO) technology is introduced into IEEE 802.11n as spatial multiplexing transmission technology and up to four-element antennas are optionally supported. Furthermore, in IEEE 802.11 ac, a multiuser (MU)-MIMO communication method is studied and the number of antenna elements to be supported is increased to 8 (Non-Patent Document 1). There is a problem in that the number of pilot signals for channel estimation increases when the number of antenna elements increases.

FIG. 6 illustrates a configuration of a conventional transmission/reception system. In FIG. 6, 1 denotes an access point, 2-1 to 2-$i$ denote a plurality of stations, 11 denotes a data selection/output circuit, 12 and 24-1 to 24-$i$ denote transmission signal generation circuits, 13 and 22-1 to 22-$i$ denote wireless signal transmission/reception circuits, 141 to 14N, 211-1 to 21M-1, and 211-$i$ to 21M-$i$ denote transmit/receive antennas, 15 and 23-1 to 23-$i$ denote reception signal demodulation circuits, 16 denotes a channel information storage circuit, 17 denotes a transmission method determination circuit, and 18 denotes a channel estimation symbol generation circuit. Here, $1 \leq i \leq K$, where K is the number of the stations, M, is the number of the transmit/receive antennas of an $i^{th}$ station, and N is the number of the transmit/receive antennas of the access point. In addition, in consideration of an OFDM system, the number of frequency channels (subcarriers) carrying signals is assumed to be F.

At the transmission from the access point 1 to a station 2-$i$, the access point 1 collects channel information representing information about a propagation environment with the antennas of each station before the access point 1 transmits data. The channel estimation symbol generation circuit 18 generates a training symbol used to estimate the channel information with the antennas of the station and outputs it to the transmission signal generation circuit 12. The transmission signal generation circuit 12 attaches a guard interval, a control signal, and the like. The wireless signal transmission/reception circuit 13 up-converts an output signal of the transmission signal generation circuit 12 into a carrier frequency and performs transmission via the transmit/receive antennas 141 to 14N.

In the station 2-$i$, the wireless signal transmission/reception circuit 22-$i$ receives a wireless signal via the transmit/receive antenna 21M-$i$, and the reception signal demodulation circuit 23-$i$ performs synchronization, channel estimation, and demodulation and outputs estimated channel information or channel-related information generated by, for example, compressing the channel information to the transmission signal generation circuit 24-$i$. The transmission signal generation circuit 24-$i$ generates a transmission signal including the channel information or the channel-related information, and outputs it to the wireless signal transmission/reception circuit 22-$i$ at a predetermined timing. The wireless signal transmission/reception circuit 22-$i$ transmits a signal including the input channel information or the channel-related information via at least one of the transmit/receive antennas 211-$i$ to 21M-$i$.

In the access point 1, a signal from the station 2-$i$ is input to the wireless signal transmission/reception circuit 13 via at least one of the transmit/receive antennas 141 to 14N. The wireless signal transmission/reception circuit 13 performs conversion into digital data by down-converting the input signal from the station 2-$i$ and outputs it to the reception signal demodulation circuit 15. The reception signal demodulation circuit 15 demodulates a reception signal, extracts channel information included in the reception signal, and outputs it to the channel information storage circuit 16.

When the channel information of the station 2-$i$ serving as a communication partner is stored, the data selection/output circuit 11 outputs information on the determined communication partner to the transmission method determination circuit 17 and outputs data to the transmission signal generation circuit 12. The transmission method determination circuit 17 determines transmission weights from the channel information stored in the channel information storage circuit 16, and outputs a transmission mode including the number of spatial streams, a modulation scheme, and a coding rate as well as the transmission weights to the transmission signal generation circuit 12. The channel estimation symbol generation circuit 18 generates a training symbol used to estimate channel information with the antennas of the station and outputs it to the transmission signal generation circuit 12. In accordance with the transmission mode determined for the station which performs communication, the transmission signal generation circuit 12 modulates and encodes a transmission signal, multiplies the transmission weights, inserts a pilot signal to be used in signal detection and communication information delivery, and outputs to the wireless signal transmission/reception circuit 13. The wireless signal transmission/reception circuit 13 up-converts an input signal into a carrier frequency and transmits via the transmit/receive antennas 141 to 14N.

As a method for selecting the communication partner, a communication partner which saves data to be transmitted in a memory and which is ready to perform transmission may be designated, a communication partner corresponding to the oldest data among a plurality of pieces of saved data may be selected, a communication partner may be selected based on quality of service (QoS) of a user, a combination of users previously determined by a group identifier (ID) may be selected, or a combination of communication partners having a low correlation of channel information may be selected.

Hereinafter, a block diagonalization (BD) directivity control method will be described as an example in which communication with a plurality of communication partners is performed using the spatial multiplexing scheme. In order to acquire channel information for the antennas of the stations 2-1 to 2-K, in the access point 1, the channel estimation symbol generation circuit 18 generates a training symbol used for channel estimation. A configuration example of the training symbol is illustrated in FIG. 7. Rectangular blocks LT (1, 1) to LT (N, N) illustrated in FIG. 7 represent OFDM symbols for the channel estimation, and guard intervals (GIs) are attached thereto. LT (j, k) corresponds to an OFDM symbol to be transmitted from a $j^{th}$ antenna at a $k^{th}$ timing in a training symbol block. LT (j, k) is obtained by performing an inverse Fourier transform on signals using known signals $s_1$ to $s_F$ at frequency channels and attaching a GI thereto. A transmission signal matrix X including transmission signals $x_{j,k,n}$ of $n^{th}$ frequency channels of LT (1, 1) to LT (N, N) is represented as follows:

[Formula 1]

$$X_n = \begin{pmatrix} x_{1,1,n} & x_{1,2,n} & \cdots & x_{1,N,n} \\ x_{2,1,n} & x_{2,2,n} & \cdots & x_{2,N,n} \\ \vdots & \vdots & \ddots & \vdots \\ x_{N,1,n} & x_{N,2,n} & \cdots & x_{N,N,n} \end{pmatrix} \quad (1)$$

$$= \begin{pmatrix} a_{1,1} & a_{1,2} & \cdots & a_{1,N} \\ a_{2,1} & a_{2,2} & \cdots & a_{2,N} \\ \vdots & \vdots & \ddots & \vdots \\ a_{N,1} & a_{N,2} & \cdots & a_{N,N} \end{pmatrix} s_n$$

$$= A s_n$$

Here, $x_{j,k,n}$ represents a transmission signal corresponding to an $n^{th}$ frequency channel of LT (j, k), A is a code matrix for the training symbol and a known matrix is used by transmission and reception ends. If an identity matrix I is used as A, it is possible to transmit $s_n$ from each antenna at a different timing. Alternatively, an orthogonal matrix that satisfies $A^H A = I$ can be used as A. Here, the superscript H represents an Hermitian transpose (complex conjugate transpose).

In the station 2-i, when a signal from the access point 1 is received, the reception signal demodulation circuit 23-i performs synchronization on the received signal and estimates a channel matrix including propagation coefficients between the access point 1 and the antennas of the station 2-i, which is channel information, from reception signals corresponding to LT (1, 1) to LT (N, N). In a reception signal corresponding to a $j^{th}$ training symbol, a reception signal vector $y_{j,i,n}$ including reception signals $y_{1,j,i,n}$ to $y_{Mi,j,i,n}$ received by the receive antennas 211-i to 21M-i on an $n^{th}$ frequency channel is represented as follows:

[Formula 2]

$$\begin{pmatrix} y_{1,j,i,n} \\ y_{2,j,i,n} \\ \vdots \\ y_{M_i,j,i,n} \end{pmatrix} = y_{j,i,n} \quad (2)$$

$$= H_{i,n} \begin{pmatrix} x_{1,j,n} \\ x_{2,j,n} \\ \vdots \\ x_{N,j,n} \end{pmatrix} + n_{j,i,n}$$

Here, $H_{i,n}$ is a channel matrix (($M_i \times N$) matrix) representing channel information about the $n^{th}$ frequency channel of the station 2-i. An element of a $p^{th}$ column and a $q^{th}$ row of the channel matrix $H_{i,n}$ represents a propagation coefficient between a $p^{th}$ transmit antenna of the access point 1 and a $q^{th}$ receive antenna of the station 2-i. $n_{j,i,n}$ represents a thermal noise vector on the transmit/receive antennas 211-i to 21M-i of the $n^{th}$ frequency channel of the station 2-i at a reception timing of the $j^{th}$ training symbol.

Consequently, in the station 2-i, a reception signal matrix $Y_{i,n}$ corresponding to first to $N^{th}$ training symbols on an $n^{th}$ frequency channel is represented as follows:

[Formula 3]

$$Y_{i,n} = (y_{1,i,n} \cdots y_{N,i,n}) = H_{i,n} X_n + N_{i,n} \quad (3)$$

$N_{i,n}$ represents a thermal noise matrix for signals received by the transmit/receive antennas 211-i to 21M-i at reception timings of the first to $N^{th}$ training symbols on the $n^{th}$ frequency channel of the station 2-i.

Because A and $s_n$ are known in the station 2-i, $X_n$ is known and the channel matrix can be obtained from the reception signal matrix $Y_{i,n}$ as follows:

[Formula 4]

$$H_{i,n}' = Y_{i,n} X_n^{-1} = H_{i,n} + N_{i,n} X_n^{-1} \quad (4)$$

The station 2-i may directly set the obtained $H'_{i,n}$ as feedback information or it may feed back $L_i$ row vectors of $H'_{i,n}$ ($L_i$ is the number of channel dimensions necessary to perform transmission to the station 2-i and is an integer greater than or equal to the number of data streams $L_i'$ for the station 2-i).

In addition, singular value decomposition on $H'_{i,n}$ may be performed, $L_i$ vectors may be selected from a right singular matrix $V^{(s)}_{i,n}$ (($N \times M_i$) matrix) corresponding to a signal space obtained as the following equation, and they may be fed back.

[Formula 5]

$$H_{i,n}' = U_{i,n} \Sigma_{i,n} (V_{i,n}^{(s)} V_{i,n}^{(n)})^H \quad (5)$$

Here, $U_{i,n}$ is a left singular matrix, $\Sigma_{i,n}$ is an ($M_i \times N$) diagonal matrix in which a singular value is set as a diagonal element and a non-diagonal term is 0, and $V^{(n)}_{i,n}$(($N \times (N-M_i)$) matrix) represents a collection of vectors that do not correspond to singular values in the right singular matrix. Here, although the number of the antennas N of the access point 1 is assumed to be greater than the number of the antennas $M_i$ of the station 2-i, when the number of the antennas $M_i$ of the station 2-i is greater than the number of the antennas N of the access point 1, all column vectors of the right singular matrix correspond to singular values, and $L_i$ vectors of the right singular matrix $V^{(s)}_{i,n}$(($N \times N$) matrix) may be selected and fed back.

Alternatively, $L_i$ vectors among basis vectors obtained by performing a Gram-Schmidt orthogonalization method on row vectors of an Hermitian matrix of $H'_{i,n}$ may be selected and fed back. The basis vectors obtained by the orthogonalization method can also be obtained by QR decomposition, the QR decomposition may be performed as the following equation, and $Q^{(s)}_{i,n}$ corresponding to an $(M_i \times M_i)$ triangular matrix $\Gamma_{i,n}$ between the obtained orthogonal matrices ($Q^{(s)}_{i,n}$ and $Q^{(n)}_{i,n}$) may be fed back.

[Formula 6]

$$(H'_{i,n})^H = (Q^{(s)}_{i,n} \quad Q^{(n)}_{i,n}) \begin{pmatrix} \Gamma_{i,n} \\ 0 \end{pmatrix} \quad (6)$$

Here, $L_i$ is the number of channel dimensions, the feedback of which has been requested from the access point 1 to the station 2-$i$, and the number of spatial streams L', in which the access point 1 actually performs transmission to the station 2-$i$ is set to be less than or equal to $L_i$. $Q^{(s)}_{i,n}$ and $V^{(s)}_{i,n}$ are part of a unitary matrix, and these matrices obtained from the channel information are defined as signal space matrices or signal space information.

The stations 2-1 to 2-K inserts, into a transmission signal, information about the $L_i$ vectors or information compressed in the form in which the information about the $L_i$ vectors is reproducible using a feature of the unitary matrix and the like, and transmit it to the access point 1 via the wireless signal transmission/reception circuit 22-$i$. The access point 1 acquires, from the stations 2-1 to 2-K, the channel information or signal space information calculated from the channel information and stores it in the channel information storage circuit 16.

In the access point 1, when transmission to the stations 2-1 to 2-K is performed, the transmission method determination circuit 17 acquires fed back information about the $L_i$ vectors from the channel information storage circuit 16. An $(N \times L_i)$ matrix including the $L_i$ vectors obtained for an $n^{th}$ frequency channel for the station 2-$i$ is defined as a signal space matrix $G_{i,n}$. $G_{i,n}$ may be a complex conjugate transpose matrix of $L_i$ row vectors of an estimated channel matrix, or a reception weight matrix $R_{i,n}$ for $L_i$ data streams may be previously defined in the station 2-$i$ and $G_{i,n}$ may be set as follows:
[Formula 7]

$$G_{i,n} = (R_{i,n} H_{i,n})^H \quad (7)$$

Alternatively, it may be set as follows:

[Formula 8]

$$G_{i,n} = [V^{(s)}_{i,n}]_{L_i} \quad (8)$$

[Formula 9]

$$G_{i,n} = [Q^{(s)}_{i,n}]_{L_i} \quad (9)$$

$[A]_L$ is a function of obtaining an $(N \times L)$ matrix by selecting L column vectors from an $(N \times M)$ matrix A. When $L_i$ is a number less than or equal to $M_i$ and $G_{i,n}$ is defined by Equation (7), if $L_i < M_i$, the station 2-$i$ may calculate a reception weight $R_{i,n}$ for $G_{i,n}$ in the station 2-$i$ in advance and store it. For the reception weight $R_{i,n}$ in the station 2-$i$, it is possible to use a reception weight obtained using a matrix obtained by multiplying $H_{i,n}^H$ from the right of $H_{i,n}$, an Hermitian matrix of an eigenvector of a matrix obtained by multiplying $H_{i,n}^H$ from the right of $H_{i,n}$, and so on. In addition, when $V^{(s)}_{i,n}$ and $Q^{(s)}_{i,n}$ of Equations (8) and (9) are obtained, $V^{(s)}_{i,n}$ and $Q^{(s)}_{i,n}$ calculated using a channel matrix $R_{i,n} H'_{i,n}$ modified using the reception weight $R_{i,n}$ instead of $H'_{i,n}$ in Equations (5) and (6) may be used.

Next, a method for determining transmission weights using signal space information will be described with respect to an example of the BD method among multiuser transmission methods. Here, a method for calculating transmission weights for an $i^{th}$ station 2-$i$ when communication is performed for K users (the stations 2-1 to 2-K) will be described. First, a set signal space matrix $G^+_{i,n}$ corresponding to stations other than the station 2-$i$ is defined as follows:

[Formula 10]

$$G^+_{i,n} = \begin{pmatrix} G^H_{1,n} \\ \vdots \\ G^H_{i-1,n} \\ G^H_{i+1,n} \\ \vdots \\ G^H_{K,n} \end{pmatrix} \quad (10)$$

Singular value decomposition on $G^+_{i,j}$ can be represented as follows:
[Formula 11]

$$G_{i,n}^+ = U_{i,n}^+ \Sigma_{i,n}^+ (V_{i,n}^{(s)+} V_{i,n}^{(n)+})^H \quad (11)$$

$V^{(s)+}_{i,n}$ is a signal space vector corresponding to an eigenvalue $\Sigma^+_{i,n}$, and $V^{(n)+}_{i,n}$ is a null space vector that has no eigenvalue or it is a null space vector corresponding to an eigenvalue 0. Here, when communication is performed for a null space represented by $V^{(n)+}_{i,n}$, no interference is generated with respect to reception weights of communication partners other than the station 2-$i$. Consequently, when communication is performed using a spatial multiplexing scheme for a plurality of communication partners, weights obtained by performing a linear operation on $V^{(n)+}_{i,n}$ obtained here can be used as transmission weights to be used in the $n^{th}$ frequency channel.

For example, it is possible to set, as the transmission weights, weights obtained by multiplying $V^{(n)+}_{i,n}$ by an Hermitian matrix of a basis vector obtained by performing the orthogonalization method on a row vector of $G_{i,n}^H V^{(n)+}_{i,n}$ obtained by multiplying the Hermitian matrix $G_{i,n}^H$ of the signal space matrix corresponding to the station 2-$i$ by $V^{(n)+}_{i,n}$ or by a right singular vector obtained by performing singular value decomposition on $G_{i,n}^H V^{(n)+}_{i,n}$. When the matrix obtained from $G_{i,n}^H V^{(n)+}_{i,n}$ is denoted as $D_{i,n}$, the transmission weights $W_{i,n}$ are represented by $[V^{(n)+}_{i,n} D_{i,n}]_{L'_i}$.

Although this is an MU-MIMO transmission method based on the BD method, it is possible to calculate $W_{i,n}$ from a signal space matrix using a zero forcing method, a minimum mean square error (MMSE) method, a successive optimization method, Tomlinson Harashima precoding, dirty paper coding, or the like.

In addition, when the number of users is 1 (K=1), it is possible to set the signal space matrix $G_{i,n}$ as transmission weights or set a right singular matrix corresponding to a signal space of the signal space matrix $G_{i,n}$ as transmission weights.

In this manner, transmission weights for each communication partner can be calculated and the obtained transmission weights $W_n$ for an $n^{th}$ frequency channel for K users can be represented as follows:

[Formula 12]

$$W_n = (W_{1,n} W_{2,n} \ldots W_{K,n}) \quad (12)$$

By performing decoding calculation by the reception end using the transmission weights, interference between users is canceled, the interference has a form that can be eliminated by the reception end, or the interference is reduced to a certain expected value in any MU-MIMO transmission weight determination such as a BD method, a zero forcing method, an MMSE method, a successive optimization method, Tomlinson Harashima precoding, or dirty paper coding (for example, see Non Patent Document 1).

PRIOR ART DOCUMENT

Non-Patent Document

Non-Patent Document 1: IEEE, "Proposed specification framework for TGac," doc.: IEEE 802.11-09/0992r21, January 2011.

SUMMARY OF INVENTION

Problems to be solved by the Invention

However, in any transmission method in accordance with the conventional art, there is a problem in that training signals equal in number to transmit antennas are necessary as illustrated in FIG. 7, an increased time for channel information estimation and information feedback is necessary, and the throughput is degraded when the number of antennas increases.

The present invention has been made in view of such circumstances, and an object thereof is to provide a wireless communication method and an access point apparatus which enable the number of training signals for channel estimation to be reduced.

Means for Solving the Problems

The present invention is a wireless communication method in which an access point apparatus including a plurality of antennas communicates with at least one station apparatus, and the method includes: a training weight reading step of reading, by the access point apparatus, training weights for a station which performs channel estimation stored in a storage unit; a weight training symbol transmission step of generating, by the access point apparatus, a weight training symbol by multiplying the training weights by a training symbol and transmitting the generated weight training symbol; a weight channel information estimation step of estimating, by the station apparatus, weight channel information from the received weight training symbol; a feedback step of transmitting, by the station apparatus, the weight channel information to the access point apparatus; a transmission weight calculation step of calculating, by the access point apparatus, transmission weights using the received weight channel information and the training weights stored in the storage unit; a data signal transmission step of transmitting, by the access point apparatus, a data signal in accordance with the transmission weights; and a training weight storage step of calculating, by the access point apparatus, new training weights using the weight channel information and the training weights stored in the storage unit and storing the calculated new training weights in the storage unit.

Preferably, in the present invention, the training weight storage step includes storing, as the new training weights, training weights obtained by multiplying the weight channel information stored in each station apparatus or a signal space matrix obtained from the weight channel information by the training weights used in the weight training symbol.

Preferably, in the present invention, the weight training symbol transmission step includes applying an orthogonalization method to the training weights for the station which performs the channel estimation read in the training weight reading step, multiplying the training symbol by an obtained orthogonal vector as the training weights, and generating the weight training symbol.

Preferably, in the present invention, the training weight storage step includes storing the transmission weights calculated in the transmission weight calculation step as the new training weights.

Preferably, in the present invention, the training weight storage step includes setting additional training weights in addition to training weights defined for each station apparatus, adding different additional training weights to the read training weights every time the training weights are read, and using the read training weights and the additional training weights in calculation of the new training weights.

Preferably, in the present invention, the training weight storage step includes selecting a different vector from a pre-stored orthogonal code matrix every time and determining the selected vector as the additional training weights.

Preferably, in the present invention, the training weight storage step includes determining the number of vectors to be used as the additional training weights using any one of a delay time until data is transmitted after the training weights are stored, a magnitude of channel fluctuation of a propagation environment, and a difference between a reference value estimated from channel information estimated for a signal from the station apparatus in uplink communication and a reference value estimated from the weight channel information fed back in downlink communication.

The present invention is an access point apparatus which includes a plurality of antennas and performs wireless communication with at least one station apparatus, and the access point apparatus includes: a storage unit which stores training weights; a training weight generation unit which generates a weight training symbol by reading the training weights for a station which performs channel estimation stored in the storage unit and multiplying the read training weights by a training symbol; a transmission signal generation unit which generates a transmission packet to which the weight training symbol has been attached; a wireless signal transmission/reception unit which converts the transmission packet into a frequency of a wireless section, transmits a resultant packet via an antenna, and receives a signal from the station apparatus via the antenna; a weight channel information extraction unit which extracts weight channel information from the received signal; a data transmission unit which calculates data signal transmission weights from the weight channel information and the training weights and outputs the calculated data signal transmission weights; and a training weight calculation unit which calculates new training weights from the weight channel information and the training weights and writes the calculated new training weights to the storage unit.

Preferably, in the present invention, the training weight generation unit includes an additional training vector candidate storage unit which stores a candidate vector for additional training weighs, reads different additional training weights every time the training weights are read, and attaches the read additional training weights to the read training weights.

Preferably, in the present invention, the training weight generation unit includes a channel evaluation unit which estimates, as a channel evaluation value, any one of a delay time until data is transmitted after the training weights are stored, a magnitude of channel fluctuation of a propagation environment, and a difference between a reference value estimated from channel information estimated for a signal from the station apparatus in uplink communication and a reference value estimated from the weight channel information fed back in downlink communication, and determines the number of vectors to be used as the additional training weights in accordance with a magnitude of the channel evaluation value.

Advantageous Effects of Invention

In accordance with the present invention, there is an advantageous effect in that the throughput or signal power by beamforming using transmission weights can be increased in MIMO communication or MU-MIMO communication while reducing the number of training signals.

MODES FOR CARRYING OUT THE INVENTION

Figure 1:
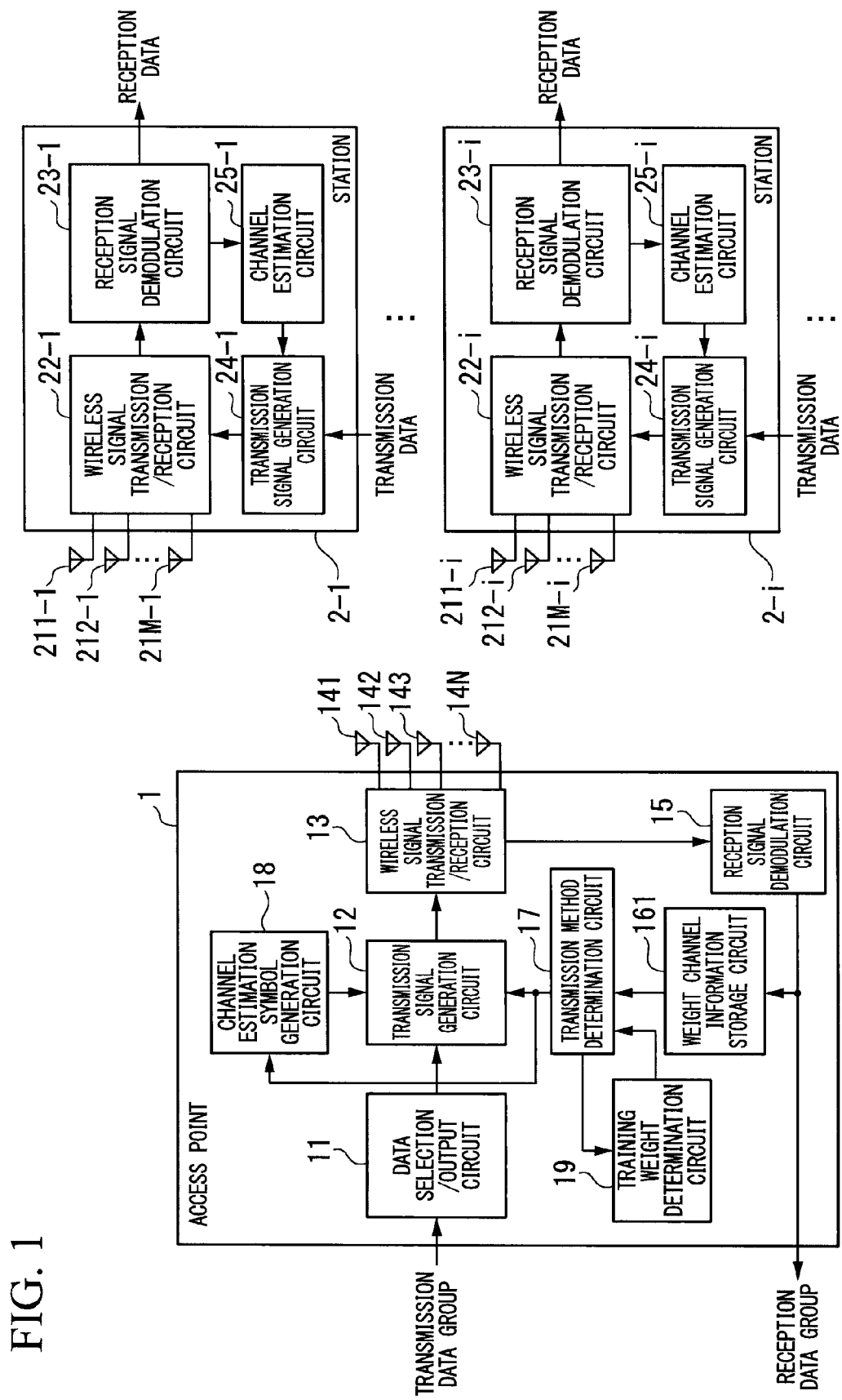
FIG. 1 is a block diagram illustrating a configuration of a wireless communication system in an embodiment of the present invention.

Hereinafter, a wireless communication method and an access point apparatus in accordance with an embodiment of the present invention will be described with reference to drawings. FIG. 1 is a block diagram illustrating a configuration of a wireless communication system in an embodiment of the present invention. In FIG. 1, 1 denotes an access point, 2-1 to 2-$i$ denote stations, 11 denotes a data selection/output circuit, 12 and 24-1 to 24-$i$ denote transmission signal generation circuits, 13 and 22-1 to 22-$i$ denote wireless signal transmission/reception circuits, 141 to 14N, 211-1 to 21M-1, and 211-$i$ to 21M-$i$ denote transmit/receive antennas, 15 and 23-1 to 23-$i$ denote reception signal demodulation circuits, 161 denotes a weight channel information storage circuit, 17 denotes a transmission method determination circuit, 18 denotes a channel estimation symbol generation circuit, 19 denotes a training weight determination circuit, and 25-1 to 25-$i$ denote channel estimation circuits. Here, $1 \leq i \leq K$, where K is the number of the stations, M, is the number of the transmit/receive antennas of an $i^{th}$ station, and N is the number of the transmit/receive antennas of the access point.

Before data communication in accordance with MIMO communication or MU-MIMO communication from the access point 1 to the station 2-$i$ is performed, channel information representing information about a propagation environment with the antennas of each station is collected. In the access point of this embodiment, training weights are used for a training symbol used to collect the channel information. The training weights are stored in the training weight determination circuit 19. The training weights include training weights to $W'_{1,n}$ to $W'_{K,n}$ of an $n^{th}$ frequency channel respectively corresponding to the stations 2-1 to 2-K and additional training weights $W'_{0,n}$, and training weights $W'_n$ of the $n^{th}$ frequency channel are represented as follows.

[Formula 13]

$$W_n' = (W_{1,n}' \ldots W_{K,n}' W_{0,n}') \quad (13)$$

When the training weights are not stored in the training weight determination circuit 19, the training weights $W'_{i,n}$ for the station 2-$i$ can be obtained as an ($N \times L_i$) matrix based on channel information stored in the weight channel information storage circuit 161. The channel information referred to here is information obtained from a channel matrix, and a signal space matrix is also included in the channel information. When no channel information is stored, it is possible to use uplink channel information from the station 2-$i$ or use arbitrary training weights. For example, a diagonal element may be se to 1 and a non-diagonal element may be set to 0, $L_i$ vectors of an ($N \times N$) Walsh orthogonal code matrix may be used, $L_i$ vectors of an ($N \times N$) Fourier transform matrix or an ($N \times N$) inverse Fourier transform matrix may be used, or $L_i$ vectors of an arbitrary ($N \times N$) orthogonal code matrix stored in advance may be used. As the arbitrary orthogonal code matrix, independent matrices may be stored for every frequency channel. Different station training weights may be selected to include different vectors.

The additional training weights $W'_{0,n}$ form a matrix including column vectors which do not have a correlation of 1 with column vectors of the training weights $W'_{1,n}$ to $W'_{K,n}$, one element of a column vector may be to 1 and the other elements may be set to 0, $L_0$ vectors of an ($N \times N$) Walsh orthogonal code matrix may be used, $L_0$ vectors of an ($N \times N$) Fourier transform matrix or an ($N \times N$) inverse Fourier transform matrix may be used, $L_0$ vectors of an arbitrary ($N \times N$) orthogonal code matrix stored in advance may be used, or basis vectors orthogonal to $L_1 + L_2 + \ldots, +L_K$ basis vectors obtained using the orthogonalization method for the training weights $W'_{1,n}$ to $W'_{K,n}$ may be used.

The channel estimation symbol generation circuit 18 generates a training symbol (weight training symbol) for estimating channel information with the antennas of the station 2-$i$ using training weights input from the transmission method determination circuit 17. That is, the weight training symbol is obtained by multiplying the training symbol by the training weights. The transmission signal generation circuit 12 attaches a guard interval and a control signal to the weight training symbol input from the channel estimation symbol generation circuit 18. The wireless signal transmission/reception circuit 13 up-converts an output signal of the transmission signal generation circuit 12 into a carrier frequency and transmits via the transmit/receive antennas 141 to 14N.

In the station 2-$i$, the wireless signal transmission/reception circuit 22-$i$ receives a signal from the access point 1 via the transmit/receive antenna 21M-i, and the reception signal demodulation circuit 23-$i$ performs synchronization, channel estimation, and demodulation, and the channel estimation circuit 25-$i$ outputs channel information (weight channel information) for an estimated signal weighted with the training weights or weight channel-related information generated by, for example, compressing the weight channel information to the transmission signal generation circuit 24-$i$. The transmission signal generation circuit 24-$i$ generates a transmission signal including the weight channel information and outputs it to the wireless signal transmission/reception circuit 22-i at a predetermined timing. The wireless signal transmission/reception circuit 22-i transmits a signal including the input weight channel information or weight channel-related information via at least one of the transmit/receive antennas 211-i to 21M-i.

In the access point 1, the signal from the station 2-i is input to the wireless signal transmission/reception circuit 13 via at least one of the transmit/receive antennas 141 to 14N. The wireless signal transmission/reception circuit 13 performs conversion into digital data by down-converting the input signal from the station 2-i and outputs it to the reception signal demodulation circuit 15. The reception signal demodulation circuit 15 demodulates a reception signal, extracts weight channel information included in the reception signal, and outputs it to the weight channel information storage circuit 161.

When the channel information of the station serving as a communication partner is stored, the data selection/output circuit 11 outputs data to the transmission signal generation circuit 12. The transmission method determination circuit 17 determines transmission weights from the weight channel information stored in the weight channel information storage circuit 161 and the training weights stored in the training weight determination circuit 19, and outputs a transmission mode including the number of spatial streams, a modulation scheme, and a coding rate as well as the transmission weights to the transmission signal generation circuit 12. In accordance with the transmission mode determined for the station which performs communication, the transmission signal generation circuit 12 modulates and encodes a transmission signal, multiplies the transmission weights, inserts a pilot signal to be used in signal detection and communication information delivery, and outputs to the wireless signal transmission/reception circuit 13. The wireless signal transmission/reception circuit 13 up-converts an input signal into a carrier frequency and transmits via the transmit/receive antennas 141 to 14N.

As a method for selecting the communication partner, a communication partner which saves data to be transmitted in a memory and which is ready to perform transmission may be designated, a communication partner corresponding to the oldest data among a plurality of pieces of saved data may be selected, a communication partner may be selected based on quality of service (QoS) of a user, a combination of users previously determined by a group ID may be selected, or a combination of communication partners having a low correlation of channel information may be selected.

Figure 2:
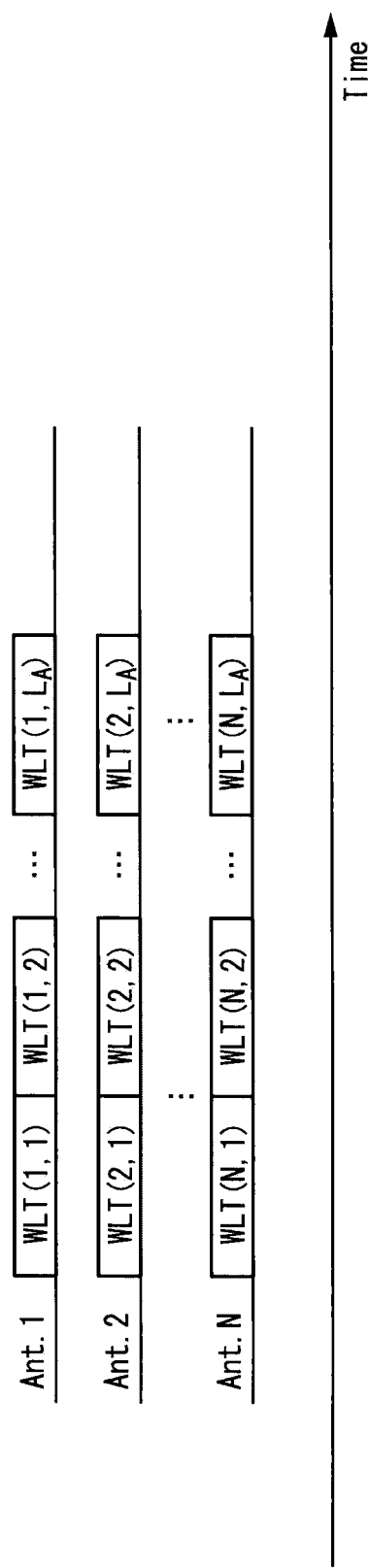
FIG. 2 is an explanatory diagram illustrating a configuration example of a training symbol.

Hereinafter, a block diagonalization (BD) directivity control method will be described as an example in which communication with a plurality of communication partners is performed using the spatial multiplexing scheme. In order to acquire channel information for transmission beams transmitted from the stations 2-1 to 2-K, in the access point 1, the transmission signal generation circuit 12 generates a weight training symbol to be used in weight channel estimation. A configuration example of the training symbol is illustrated in FIG. 2. Rectangular blocks WLT (1, 1) to WLT (N, $L_A$) illustrated in FIG. 2 represent OFDM symbols for channel estimation, and guard intervals (GI) are attached thereto. Here, $L_A$ is obtained by adding a sum of $L_1$ to $L_K$ to the number of column vectors $L_0$ of the additional training weights W'$_{0, n}$.

[Formula 14]

$$L_A = \sum_{i=1}^{K} L_i + L_0, \quad 0 \le L_0 \le N - \sum_{i=1}^{K} L_i \quad (14)$$

Here, $L_0 \ge 0$, and $L_0 = 0$ can be set when $K \ge 2$. When a value set in $L_0$ is small, a training section can be reduced. Alternatively, when the time fluctuation of the channel is very small, $L_0 = 0$ can also be set.

Using only the sum of the numbers of the channel dimensions necessary for the transmission to the stations as $L_A$, it is possible to avoid transmission of an unnecessary preamble (training). It is to be noted that the column vectors of the additional training weights are not used for data transmission, but they provides an advantage of improving the precision of weight channel information estimated in each station and causing the effect of the proposed method to gradually approach the performance when channel information is estimated in the conventional scheme.

WLT (j, k) corresponds to an OFDM symbol to be transmitted from a $j^{th}$ antenna at a $k^{th}$ timing in a weight training symbol block. WLT (j, k) is obtained by performing an inverse Fourier transform on signals using known signals $s_1$ to $s_F$ in frequency channels and training weights W'$_1$ to W'$_F$ and attaching a GI thereto. A transmission signal matrix $X_n$ including transmission signals $x_{j, k, n}$ of an $n^{th}$ frequency channel of WLT (1, 1) to WLT (N, $L_A$) is represented as follows:

[Formula 15]

$$x_n = \begin{pmatrix} x_{1,1,n} & x_{1,2,n} & \cdots & x_{1,L_A,n} \\ x_{2,1,n} & x_{2,2,n} & \cdots & x_{2,L_A,n} \\ \vdots & \vdots & \ddots & \vdots \\ x_{N,1,n} & x_{N,2,n} & \cdots & x_{N,L_A,n} \end{pmatrix} = \begin{pmatrix} w'_{1,1,n} & w'_{1,2,n} & \cdots & w'_{1,L_A,n} \\ w'_{2,1,n} & w'_{2,2,n} & \cdots & w'_{2,L_A,n} \\ \vdots & \vdots & \ddots & \vdots \\ w'_{N,1,n} & w'_{N,2,n} & \cdots & w'_{N,L_A,n} \end{pmatrix} \quad (15)$$

$$\begin{pmatrix} a_{1,1} & a_{1,2} & \cdots & a_{1,L_A} \\ a_{2,1} & a_{2,2} & \cdots & a_{2,L_A} \\ \vdots & \vdots & \ddots & \vdots \\ a_{L_A,1} & a_{L_A,2} & \cdots & a_{L_A,L_A} \end{pmatrix} s_n = W'_n A s_n$$

Here, $X_{j, k, n}$ represents a transmission signal corresponding to the $n^{th}$ frequency channel of WLT (j, k), and A is a code matrix for the training symbol and a known matrix is used by transmission and reception ends. A can be defined as an ($L_A \times L_A$) matrix. If an identity matrix I is used as A, each timing corresponds to one training weight. Alternatively, an orthogonal matrix that satisfies $A^H A = I$ can be used as A.

In the station 2-i, when a signal from the access point 1 is received, the reception signal demodulation circuit 23-i performs synchronization on the received signal and estimates a channel matrix (weight channel matrix) including training weights which is configured by propagation coefficients between the access point 1 and the antennas of the station 2-i, which is channel information, from reception signals corresponding to WLT (1, 1) to WLT (N, $L_A$). A reception signal vector including reception signals $y_{1, j, i, n}$ to $y_{Mi, j, i, n}$ which correspond to a $j^{th}$ training symbol and which are received by the receive antennas 211-i to 21M-i on an $n^{th}$ frequency channel is represented as follows:

[Formula 16]

$$\begin{pmatrix} y_{1,j,i,n} \\ y_{2,j,i,n} \\ \vdots \\ y_{M_i,j,i,n} \end{pmatrix} = y_{j,i,n} = H_{i,n} \begin{pmatrix} x_{1,j,n} \\ x_{2,j,n} \\ \vdots \\ x_{N,j,n} \end{pmatrix} + n_{j,i,n} \quad (16)$$

Here, $H_{i,n}$ is a channel matrix (($M_i \times N$) matrix) representing channel information for the $n^{th}$ frequency channel of the station 2-$i$. An element of a $p^{th}$ column and a $q^{th}$ row of the channel matrix $H_{i,n}$ represents a propagation coefficient between a $p^{th}$ transmit antenna of the access point 1 and a $q^{th}$ receive antenna of the station 2-$i$. $n_{j,i,n}$ represents a thermal noise vector on the transmit/receive antennas 211-$i$ to 21M-$i$ of the $n^{th}$ frequency channel of the station 2-$i$ at a reception timing of the $j^{th}$ training symbol. Consequently, a reception signal matrix $Y_{i,n}$ corresponding to first to $N^{th}$ training symbols at the $n^{th}$ frequency channel of the station 2-$i$ is represented as follows:

[Formula 17]

$$Y_{i,n} = (y_{1,i,n} \ldots y_{N,i,n}) = H_{i,n}X_n + N_{i,n} \quad (17)$$

$N_{i,n}$ represents a thermal noise matrix for signals received by the transmit/receive antennas 211-$i$ to 21M-$i$ at reception timings of $j^{th}$ (j=1 to $L_A$) training symbols on the $n^{th}$ frequency channel of the station 2-$i$.

Because A and $s_n$ are known in the station 2-$i$, the weight channel matrix can be obtained as the following equation by multiplying the reception signal matrix $Y_{i,n}$ by $(As_n)^{-1}$.

[Formula 18]

$$Y_{i,n}(As_n)^{-1} = H_{i,n}W_n'As_n(As_n)^{-1} + N_{i,n}(As_n)^{-1} = H_{i,n}W_n' + N_{i,n}' \quad (18)$$

Here, the estimated weight channel matrix is defined as $H''_{i,n}$. $H''_{i,n}$ is an ($M_i \times L_A$) matrix. The station 2-$i$ can directly set the obtained $H''_{i,n}$ as feedback information, feed back $L_i$ row vectors of $H''_{i,n}$, or perform singular value decomposition on $H''_{i,n}$ and feed back $L_i$ column vectors of a right singular matrix $V^{(ws)}_{i,n}$ (($L_A \times M_i$) matrix) corresponding to a signal space obtained as the following equation.

[Formula 19]

$$H''_{i,n} = U^{(w)}_{i,n} \Sigma^{(w)}_{i,n} (V^{(ws)}_{i,n} V^{(wn)}_{i,n})^H \quad (19)$$

Here, $U^{(w)}_{i,n}$ is a left singular matrix, $\Sigma^{(w)}_{i,n}$ is an ($M_i \times L_A$) diagonal matrix in which a singular value is set as a diagonal element and a non-diagonal term is 0, and $V^{(wn)}_{i,n}$ (($L_A \times (L_A - M_i)$)) matrix) represents a collection of vectors that do not correspond to singular values of the right singular matrix. Here, although the number of the antennas N of the access point 1 is assumed to be greater than $L_A$, when $L_A$ is less than the number of antennas $M_i$, all column vectors of the right singular matrix correspond to singular values and it is possible to select and feed back $L_i$ vectors of the right singular matrix $V^{(ws)}_{i,n}$ (($L_A \times L_A$) matrix). Alternatively, $L_i$ vectors among basis vectors obtained by performing a Gram-Schmidt orthogonalization method on column vectors of an Hermitian transpose matrix of $H''_{i,n}$ may be select and fed back. The basis vectors by the orthogonalization method can also be obtained by QR decomposition, the QR decomposition may be performed as the following equation, and corresponding to an ($M_i \times M$) triangular matrix $\Gamma^{(w)}_{i,n}$ between the obtained orthogonal matrices ($Q^{(ws)}_{i,n}$ and $Q^{(wn)}_{i,n}$) may be fed back.

[Formula 20]

$$(H''_{i,n})^H = (Q^{(ws)}_{i,n} \quad Q^{(wn)}_{i,n}) \begin{pmatrix} \Gamma^{(w)}_{i,n} \\ 0 \end{pmatrix} \quad (20)$$

Here, $L_i$ is the number of channel dimensions, the feedback of which has been requested from the access point 1 to the station 2-$i$, and the number of spatial streams $L'_i$ in which the access point 1 actually performs transmission to the station 2-$i$ is set to be less than or equal to $L_i$. $Q^{(ws)}_{i,n}$ and $V^{(ws)}_{i,n}$ are part of a unitary matrix, and these matrices obtained from the channel information are defined as weight signal space matrices $G'_{i,n}$ or weight channel information.

The stations 2-1 to 2-K inserts, in a transmission signal, information about the $L_i$ vectors or information compressed in the form in which the information about the $L_i$ vectors is reproducible using a feature of the unitary matrix and the like, and transmit it to the access point 1 via the wireless signal transmission/reception circuit 22-$i$. The access point 1 acquires weight channel information from the stations 2-1 to 2-K and stores it in the weight channel information storage circuit 161.

In the access point 1, when transmission to the stations 2-1 to 2-K is performed, the transmission method determination circuit 17 acquires fed back information from the weight channel information storage circuit 161. The ($L_A \times L_i$) matrix $G'_{i,n}$ including the $L_i$ vectors obtained for an $n^{th}$ frequency channel for the station 2-$i$ may be a complex conjugate transpose matrix of $L_i$ row vectors of an estimated channel matrix, or a reception weight matrix $R_{i,n}$ for $L_i$ data streams may be previously defined in the station 2-$i$ and $G'_{i,n}$ may represented as follows:

[Formula 21]

$$G_{i,n}' = (R_{i,n}H_{i,n}''')^H \quad (21)$$

Alternatively, it may be represented as follows:

[Formula 22]

$$G'_{i,n} = [V^{(ws)}_{i,n}]_{L_i} \quad (22)$$

[Formula 23]

$$G'_{i,n} = [Q^{(ws)}_{i,n}]_{L_i} \quad (23)$$

Alternatively, when $V^{(ws)}_{i,n}$ and $Q^{(ws)}_{i,n}$ of Equations (22) and (23) are obtained, $V^{(ws)}_{i,n}$ or $Q^{(ws)}_{i,n}$ calculated using a channel matrix $R_{i,n}H''_{i,n}$ modified using the reception weight $R_{i,n}$ instead of $H''_{i,n}$ in Equations (19) and (20) may be used.

When $G'_{i,n}$ is defined in accordance with Equation (21), the reception weight $R_{i,n}$ for $G'_{i,n}$ in the station 2-$i$ is previously calculated in the station 2-$i$. For the reception weight $R_{i,n}$ in the station 2-$i$, reception weights obtained using a matrix obtained by multiplying $H''_{i,n}{}^H$ from the right of $H''_{i,n}$, an Hermitian matrix of an eigenvector of a matrix obtained by multiplying $H''_{i,n}{}^H$ from the right of $H''_{i,n}$, and so on may be used.

Next, a method for selecting a communication partner in accordance with the BD method for multiuser will be described. Here, a method for calculating transmission weights for an $i^{th}$ station 2-$i$ when communication is performed for K users (stations 2-1 to 2-K) will be described. First, a set signal space matrix $G'^{+}_{i,n}$ corresponding to stations other than the station 2-$i$ is defined as follows:

[Formula 24]

$$G'^{+}_{i,n} = \begin{pmatrix} G'^{H}_{1,n} \\ \vdots \\ G'^{H}_{i-1,n} \\ G'^{H}_{i+1,n} \\ \vdots \\ G'^{H}_{K,n} \end{pmatrix} \quad (24)$$

When singular value decomposition on $G'^{+}_{i,j}$ is performed, it can be represented as follows:

[Formula 25]

$$G_{i,n}'^{+} = U_{i,n}^{(w)+} \Sigma_{i,n}^{(w)+} (V_{i,n}^{(ws)+} V_{i,n}^{(wn)+})^{H} \quad (25)$$

$V^{(ws)+}_{i,n}$ is a signal space vector corresponding to an eigenvalue $\Sigma^{(w)+}_{i,n}$, and $V^{(wn)+}_{i,n}$ is a null space vector that has no eigenvalue or it is a null space vector corresponding to an eigenvalue 0. Here, when communication is performed for a null space represented by $V^{(wn)+}_{i,n}$, no interference is generated with respect to reception weights of the signal space vector $G'_{i,n}$ of communication partners other than the station 2-$i$.

Consequently, when communication is performed using a spatial multiplexing scheme for a plurality of communication partners, it is possible to use weights obtained by performing a linear operation on $V^{(wn)+}_{i,n}$ obtained here as transmission weights to be used in the $n^{th}$ frequency channel. For example, using an $((N-(L_A-L_i))\times L_i)$ matrix $D'_{i,n}$ obtained by a linear calculation from $G'_{i,n}{}^{H}V^{(wn)+}_{i,n}$ that is obtained by multiplying the Hermitian matrix $G'_{i,n}{}^{H}$ of the weight signal space matrix corresponding to the station 2-$i$ by $V^{(wn)+}_{i,n}$, a virtual transmission weight $W^{(v)}_{i,n}$ is represented as follows:

[Formula 26]

$$W^{(v)}_{i,n} = [V^{(ws)}_{i,n} + D'_{i,n}]_{L'_i} \quad (26)$$

Here, it is possible to use, as an Hermitian matrix of a basis vector obtained by performing the orthogonalization method on a row vector of $G'_{i,n}{}^{H}V^{(wn)+}_{i,n}$, a right singular vector obtained by performing singular value decomposition on $G'_{i,n}{}^{H}V^{(wn)+}_{i,n}$, or a basis vector corresponding to an upper triangular matrix obtained by performing QR decomposition on $G'_{i,n}{}^{H}V^{(wn)+}_{i,n}$.

Although the above description is directed to an MU-MIMO transmission method based on the BD method, it is possible to calculate virtual transmission weights $W^{(v)}_{i,n}$ of an $(L_A \times L'_i)$ matrix from the weight signal space matrix using a zero forcing method, an MMSE method, a successive optimization method, Tomlinson Harashima precoding, dirty paper coding, or the like.

In addition, when the number of users is 1 (K=1), the signal space matrix $G'_{i,n}$ may be used as the virtual transmission weight $W^{(v)}_{i,n}$, or a right singular matrix corresponding to a signal space of the signal space matrix $G'_{i,n}$ may be used as the virtual transmission weight $W^{(v)}_{i,n}$.

As described above, in this embodiment, as in the conventional MIMO communication or MU-MIMO communication, transmission weights are calculated from channel information obtained using the weight training symbol, and they are obtained as virtual transmission weights. Because the virtual transmission weights are calculated based on the channel information transmitted using the training weights, the training weights to be used in the transmission signal generation circuit 12 can be represented using the training weights $W'_n$ and the virtual transmission weights $W^{(v)}_{i,n}$. Transmission weights $W_{i,n}$ of an $(N \times L'_i)$ matrix can be calculated as follows:

[Formula 27]

$$W_{i,n} = W'_n W^{(v)}_{i,n} \quad (27)$$

By performing control in this manner, the access point 1 can decrease the number of time slots of LT to be used in channel estimation to $L_A$ and decrease the size of the signal space matrix $G'_{i,n}$ fed back from the station 2-$i$ to $(L_A \times L_i)$. In addition, the computation complexity of the transmission weights can also be reduced because the size of the signal space matrix $G'_{i,n}$ to be used in the signal processing is reduced.

When the transmission weights $W_{i,n}$ are obtained, they are newly stored in the training weight determination circuit 19. When the transmission signal generation circuit 12 newly generates a weight training symbol, $W_{i,n}$ can be used as the training weights $W'_{i,n}$. Alternatively, when the number of spatial streams $L'_i$ in which transmission is actually performed is less than the number of streams $L_i$ in which channel estimation is performed, the training weight determination circuit 19 may store, as $W'_{i,n}$, an $(N \times L_i)$ matrix represented by the following expression which is generated from virtual transmission weights $W'^{(v)}_{i,n}$ of an $(L_A \times L_i)$ matrix before $L'_i$ vectors are selected in accordance with Equation (24) and the like.

[Formula 28]

$$W'_n W'^{(v)}_{i,n} \quad (28)$$

Here, $W'^{(v)}_{i,n}$ is calculated, for example, as follows:

[Formula 29]

$$W'^{(v)}_{i,n} = V^{(ws)+}_{i,n} D_{i,n}' \quad (29)$$

Because the scheme of this embodiment reduces the number of training symbols used to estimate a channel, there are advantages such as a reduction in a degradation of the throughput due to an overhead in a communication format of the training symbols and a feedback amount of signal space information, a decrease in a computational load of transmission weights, and a decrease in a channel estimation error due to time fluctuation of a channel as a result of the shortening of a channel estimation block. However, only a partial matrix is acquired in a channel matrix between the antennas of the access point and the antennas of the station, and thus communication quality is likely to be degraded. In order to reduce such degradation of communication quality, the additional training weights $W'_{0,n}$ can be used. That is, there are characteristics that a propagation environment from the access point to the station is not necessarily completely varied in every communication but it is gradually varied. By taking advantage of these characteristics to thereby use different additional training weights $W'_{0,n}$ every time a weight channel is estimated, it is possible to obtain information close to a channel matrix between the antennas of the access point and the antennas of the station and cause the precision of the obtained channel information to gradually approach that of the conventional scheme which uses N LTs, while using $L_A$ WLTs every time.

As a candidate for the additional training weights $W'_{0,n}$, an additional training weight candidate matrix E can be previously stored in the training weight determination circuit 19. E is an (N×N) matrix, and $L_0$ column vectors are selected as the additional training weights $W'_{0,n}$ from E every time a weight training symbol is generated. For example, it is possible to select different column vectors such as first to $L_0{}^{th}$ column vectors of E in first transmission of a weight training symbol and $(L_0+1)^{th}$ to $(2L_0)^{th}$ column vectors of E in second transmission of a weight training symbol. As E, an (N×N) identity matrix in which a diagonal element is 1 and a non-diagonal element is 0, a Walsh orthogonal code, a Fourier transform matrix, an inverse Fourier transform matrix, or an arbitrary orthogonal matrix can be used. Alternatively, the additional training weights $W'_{0,n}$ may be obtained every time through calculation. Here, additional training weights to be used in transmission of a weight training symbol of a $u^{th}$ time are denoted as $W'_{0,u,n}$. In the first transmission of a weight training symbol, after training weights $W'_{1,n}$ to $W'_{K,n}$ are determined, it is possible to use a basis vector orthogonal to these matrices as $W'_{0,1,n}$.

For example, it is possible to select $L_0$ vectors from $Q'^{(n)}_n$ corresponding to a zero matrix obtained using QR decomposition as follows:

[Formula 30]

$$(W'_{1,n} \ \ldots \ W'_{K,n}) = (Q'^{(s)}_n \ Q'^{(n)}_n)\begin{pmatrix} R'_n \\ 0 \end{pmatrix} \quad (30)$$

In the second transmission of a weight training symbol, $W'_{0,1,n}$ used in communication until the previous time is added to an orthogonality condition. For the additional training weights $W'_{0,u,n}$ in communication of the $u^{th}$ time, a basis vector orthogonal to the training weights $W'_{1,n}$ to $W'_{K,n}$ and $W'_{0,u-1,n}$ can be used.

For example, for additional training weights to be used in the second transmission of a weight training symbol, it is possible to select $L_0$ vectors of $Q'^{(n)}_n$ corresponding to a zero matrix obtained using QR decomposition as follow:

[Formula 31]

$$(W'_{1,n} \ \ldots \ W'_{K,n} \ W'_{0,1,n}) = (Q'^{(s)}_n \ Q'^{(n)}_n)\begin{pmatrix} R'_n \\ 0 \end{pmatrix} \quad (31)$$

Alternatively, as the additional training weights $W'_{0,u,n}$ in communication of the $u^{th}$ time, a basis vector orthogonal to the training weights $W'_{1,n}$ to $W'_{K,n}$ and $W'_{0,1,n}$ to $W'_{0,u-1,n}$ can be used.

For example, it is possible to select $L_0$ vectors from $Q'^{(n)}_n$ corresponding to a zero matrix obtained using QR decomposition as follows:

[Formula 32]

$$(W'_{1,n} \ \ldots \ W'_{K,n} \ W'_{0,1,n} \ \ldots \ W'_{0,u-1,n}) = (Q'^{(s)}_n \ Q'^{(n)}_n)\begin{pmatrix} R'_n \\ 0 \end{pmatrix} \quad (32)$$

Here, this flow can be performed if the following is satisfied.

[Formula 33]

$$uL_0 + \sum_{i=1}^{K} L_i \leq N \quad (33)$$

In contrast, if Expression (33) is not satisfied or if the value of the left side of Expression (33) is close to N, a reset operation u=1 is performed, and thus it becomes possible to calculate additional training weights from Equation (30) again. Alternatively, $L_Z$ vectors may be selected from additional training weights used in recent training symbol transmission and they may be used as an orthogonality condition added to the training weights $W'_{1,n}$ to $W'_{K,n}$. Here, $L_Z$ satisfies $1 \leq L_Z \leq N-(L_1+L_2+\ldots+L_K)-L_0$.

Every time communication is performed, a combination of stations which perform communication and/or the number of stations which perform communication may be varied. This includes a case in which there are $K_A$ stations belonging to the access point 1 and K stations are selected in every communication. In such a case, training weights for each combination of selected stations can be independently stored in the training weight determination circuit 19. In this manner, with the use of transmission weights as training weights, even when a data signal is attached to the end of weight training symbols as illustrated in FIG. 2 and data communication in accordance with single-user MIMO or multiuser MIMO is performed, the access point 1 can update the training weights using weight channel information obtained from the weight training symbols that has been fed back to the access point 1.

In addition, training weights may be updated using signal space information rather than setting transmission weights to be used in data communication as the training weights. When the training weights of the station 2-$i$ are updated using the fed-back signal space matrix, the training weights can be updated using training weights $W'_n$ of an (N×$L_A$) matrix and a signal space matrix $G'_{i,n}$ of an ($L_A$×$L_i$) matrix as follows:

[Formula 34]

$$W_{i,n}' = W_n' G_{i,n}' \quad (34)$$

Alternatively, it is possible to use $Q^{(ps)}_{i,n}$ obtained as follows as new $W'_{i,n}$.

[Formula 35]

$$W'_n G'_{i,n} = (Q^{(ps)}_{i,n} \ Q^{(pn)}_{i,n})\begin{pmatrix} R^{(p)}_{i,n} \\ 0 \end{pmatrix} \quad (35)$$

When the signal space matrix $G'_{i,n}$ is an Hermitian matrix of the channel matrix $H''_{i,n}$, it is possible to newly calculate a basis vector corresponding to a right singular matrix corresponding to a signal space of the signal space matrix $G'_{i,n}$ or an upper triangular matrix obtained by QR decomposition of an Hermitian matrix of the signal space matrix $G'_{i,n}$ and substitute it as the signal space matrix $G'_{i,n}$ into Equation (34) or (35). By performing control in this manner, it is possible to update training weights for a station every time communication is performed without being affected by a combination of users in MU-MIMO.-

In a case in which the training weights are updated independent of the transmission weights as described above, when the weight channel information is fed back from the station and stored in the weight channel information storage circuit 161, the transmission method determination circuit 17 calculates transmission weights and new training weights from the stored weight channel information and the training weights stored in the training weight determination circuit 19. The transmission weights are calculated with, for example, Equations (26) and (27), the calculated transmission weights are output to the transmission signal generation circuit 12 and the channel estimation symbol generation circuit 18, and the channel estimation symbol generation circuit 18 generates a transmission weight training symbol obtained by multiplying a training symbol by the transmission weights and outputs it to the transmission signal generation circuit 12. The transmission signal generation circuit 12 attaches the input transmission weight training symbol to a data signal, multiplies the data signal by the transmission weights, and transmit via the wireless signal transmission/reception circuit 13 and the transmit/receive antennas.

On the other hand, the training weight determination circuit 19 updates the training weights in accordance with Equation (34) or (35) and stores them. At this time, the additional training weights may also be updated and stored. When a station which estimates channel information is determined, training weights for the station is output to the transmission signal generation circuit 12 and a new weight training symbol is generated in accordance with Equation (13).

In addition, in this mode, a transmission packet for channel estimation does not necessarily include transmission data, and thus it is possible to select K stations for performing the channel estimation separately from a station which sends the transmission data. That is, in this mode, K stations in Equation (13) when the training weights are obtained are those selected for the channel estimation, they are a set independent of the K stations selected at data communication, and K at the channel estimation is not necessarily equal to K at the data communication. Consequently, if the number of stations selected for the channel estimation is newly defined as $K_A$, the weight training symbol can be represented as follows:

[Formula 36]

$$W_n' = (W_{1,n}' \ldots W_{K_A,n}' W_{0,n}') \tag{36}$$

In addition, $K_A$ stations may include K stations which transmit data. In this case, a weight training symbol for a station 2-z ($K+1 \leq z \leq K+K_0$) which is not a communication partner may be generated and transmitted. At this time, the training weights are generated as follows.

[Formula 37]

$$W_n' = (W_{1,n}' \ldots W_{K,n}' W_{K+1,n}' \ldots W_{K+K_0,n}' W_{0,n}') \tag{37}$$

Here, $K+K_0=K_A$, and the number of column vectors $L_A$ of $W_n'$ satisfies $L_A \leq N$. A signal space matrix $G'_{z,n}$ is fed back from the station 2-z ($K+1 \leq z \leq K+K_0$) to the access point 1, and the access point 1 can update the transmission weights for the station 2-z by setting i=z in Equation (34). In addition, in this mode, the training weights are independently updated for each station, and thus training weights of a plurality of stations may have a high correlation therebetween when there is a combination of stations in which correlation between channel matrices is high. In order to prevent training weights from having such a high correlation, orthogonalization may be performed on training weights for the stations 2-1 to 2-$K_A$, $Q^{(as)}_n$ of an (N×($L_1+L_2+\ldots+L_{KA}$)) matrix obtained as follows may be used, and the following Equation (39) may be used.

[Formula 38]

$$(W_{1,n}' \ldots W_{K_A,n}') = (Q_n^{(as)} \quad Q_n^{(an)}) \begin{pmatrix} R_n^{(a)} \\ 0 \end{pmatrix} \tag{38}$$

[Formula 39]

$$W_n' = (Q_n^{(as)} W_{0,n}') \tag{39}$$

Here, $L_0$ vectors selected from $Q^{(an)}_n$ of Equation (38) may be used for $W'_{0,n}$. Alternatively, additional training weights may be taken into consideration in orthogonalization of the training weights, $Q^{(as)}_n$ of an (N×$L_A$) matrix obtained by the following Equation (40) may be used, and training weights obtained by the following Equation (41) may be used.

[Formula 40]

$$(W_{1,n}' \ldots W_{K_A,n}' W_{0,n}') = (Q_n^{(as)} \quad Q_n^{(an)}) \begin{pmatrix} R_n^{(a)} \\ 0 \end{pmatrix} \tag{40}$$

[Formula 41]

$$W_n' = Q_n^{(as)} \tag{41}$$

The additional training weights facilitate a process of causing the training weights $W'_{i,n}$ obtained for each station 2-i to gradually approach a right singular vector $V^{(s)}_{i,n}$ corresponding to a signal space of a channel matrix $H_{i,n}$ which is information with all transmit antennas for the $i^{th}$ station. Consequently, the additional training weights are not necessary in a state in which the training weight $W'_{i,n}$ is gradually approaching the right singular vector $V^{(s)}_{i,n}$, or the number of additional training weights $L_0$ can be reduced. Therefore, it is also possible to change the size $L_0$ of the additional training weights in accordance with a communication state. Because a large amount of channel information is obtained when $L_0$ is set to be large, it is possible to improve communication quality for the station by setting $L_0$ to a large value in a state in which a correlation between the training weights $W'_{i,n}$ and the right singular vector $V^{(s)}_{i,n}$ is considered to be low at the initiation of communication with the station. For example, it is possible to determine $L_0$ based on how old information on transmission weights stored in the training weight determination circuit 19 is. If the transmission weights stored in the training weight determination circuit 19 are previous information of a time T on average, the access point 1 can pre-store a table of $L_0$ for T. For example, it is possible to perform a setting process so that $L_0=4$ if T is greater than or equal to 100 ms, $L_0=2$ if T is 100 ms to 10 ms, and $L_0=1$ if T is less than or equal to 10 ms.

Alternatively, the size $L_0$ of the additional training weights may be changed in accordance with a state of a propagation environment. That is, the access point 1 may estimate fluctuation per unit time of channel information between the access point 1 and the station 2-i, and may set $L_0$ to a large value if the propagation environment temporally fluctuates. For example, a correlation value ρ with the channel information estimated in communication of a previous time may be calculated using channel information estimated from an uplink signal received from the station 2-i and a setting process may be performed so that $L_0=4$ if ρ is less than or equal to 0.9, $L_0=2$ if ρ is 0.9 to 0.99, and $L_0=1$ if ρ is greater than or equal to 0.99.

Alternatively, a station may feed back a power value and/or an eigenvalue of a channel matrix estimated in downlink, and the access point may compare it with a power value and/or an eigenvalue of a channel matrix estimated in uplink communication and determine $L_0$ in accordance with the magnitude of the deviation between the power values and/or the eigenvalues. Although an uplink channel matrix is not necessarily a transpose matrix of a downlink channel matrix because a path along which signals pass through circuits with respect to the uplink is different from that with respect to the downlink, part of the power values of the uplink channel matrix and/or their eigenvalues are expected to be equal to part of the power values of a downlink weight channel matrix and/or their eigenvalues if differences in terms of the number of timing slots used for estimation, the number of receive antenna elements, the number of stations which perform simultaneous transmission, a correlation value between row vectors of channel matrices of stations, and a transmit power are corrected. The degree in which training weights and/or transmission weights determined in the downlink utilize power values and/or eigenvalues of the channel matrix estimated in the uplink is determined from the weight channel matrix of the downlink, $L_0$ is set to a large value if the difference between the power values and/or the eigenvalues is large. For example, $L_0=4$ can be set if a first eigenvalue of the weight channel matrix of the downlink relative to the first eigenvalue of the uplink is less than or equal to 3 dB, $L_0=2$ can be set if the difference is 3 dB to 1 dB, and $L_0=1$ can be set if the difference is less than or equal to 1 dB.

Figure 3:
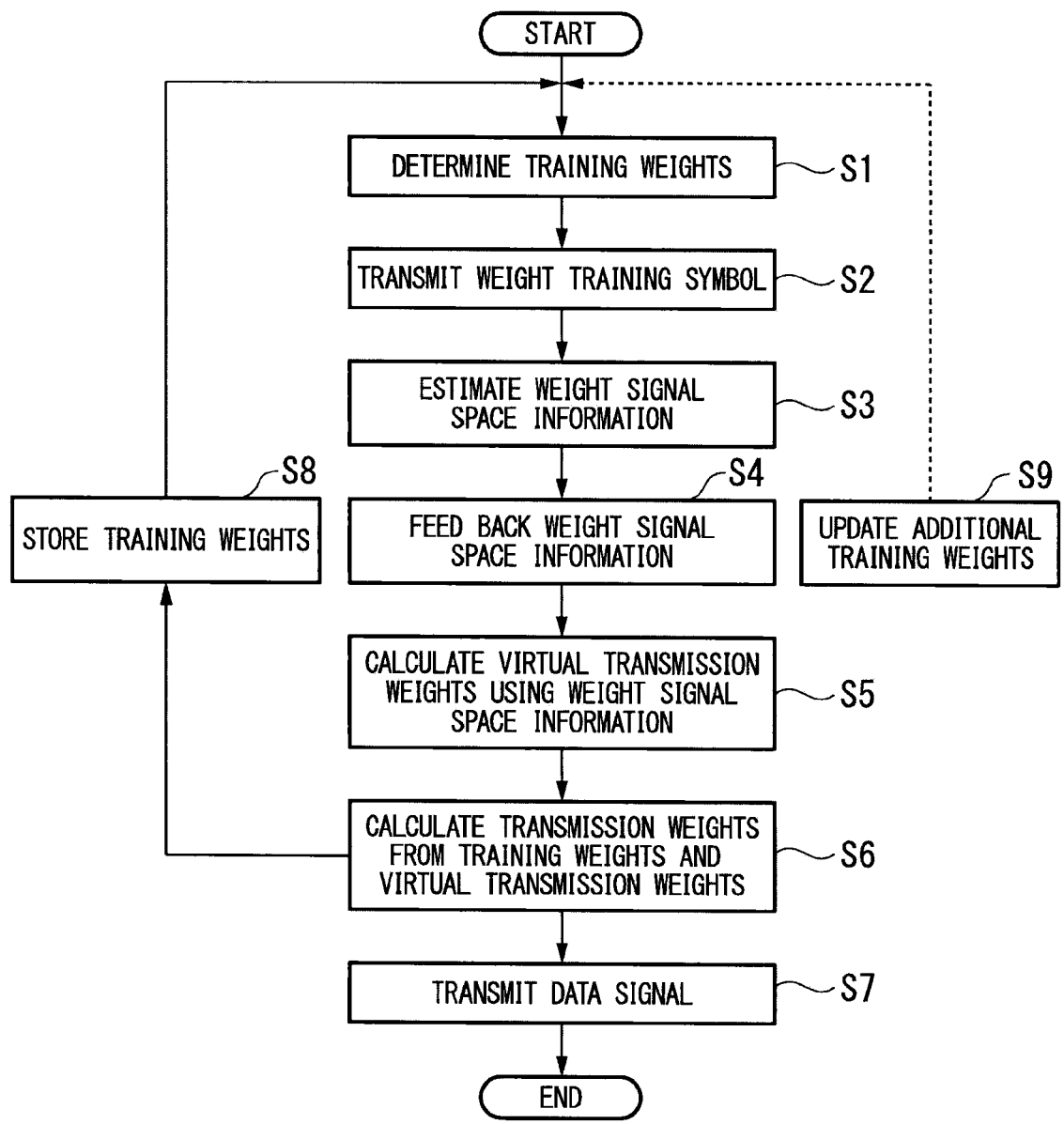
FIG. 3 is a flowchart illustrating a processing operation of an apparatus illustrated in FIG. 1.

Next, an operation of the apparatus illustrated in FIG. 1 will be described with reference to FIG. 3. FIG. 3 is a flowchart illustrating the operation of the apparatus illustrated in FIG. 1. First, when transmission data from the access point 1 to the station 2-*i* is generated, the access point 1 determines training weights (step S1) and transmits a weight training symbol (step S2). The station 2-*i* receives the weight training symbol, estimates weight channel information (weight signal space information) (step S3), generates the weight channel information, and feeds back it to the access point 1 (step S4).

Next, the access point 1 calculates virtual transmission weights using the fed-back weight channel information (step S5), calculates transmission weights from the training weights and the virtual transmission weights (step S6), transmits data in accordance with the transmission weights (step S7), and ends communication. The transmission weights calculated in step S6 are stored (step S8), and they can be used as training weights at communication of the next time. In addition, additional training weights to be used in the training weights are updated in every communication (step S9).

Figure 4:
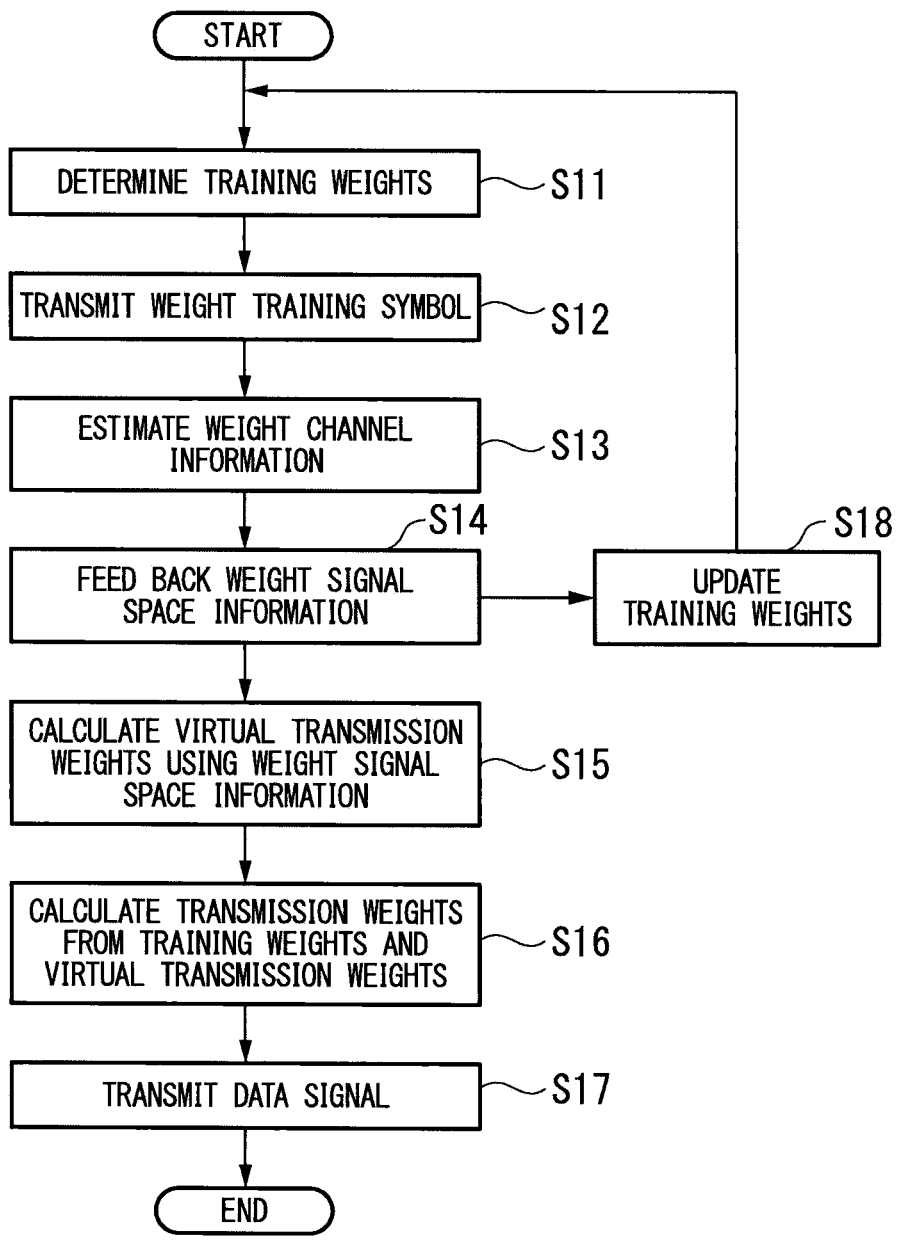
FIG. 4 is a flowchart illustrating a processing operation of the apparatus illustrated in FIG. 1.

Next, a modified example of the operation of the apparatus illustrated in FIG. 1 will be described with reference to FIG. 4. FIG. 4 is a flowchart illustrating the operation of the apparatus illustrated in FIG. 1. First, when transmission data from the access point 1 to the station 2-*i* is generated, the access point 1 determines training weights (step S11) and transmits a weight training symbol (step S12). The station 2-*i* receives the weight training symbol, estimates weight channel information (step S13), generates the weight channel information, and feeds back it to the access point 1 (step S14).

The access point 1 calculates virtual transmission weights using the fed-back weight channel information (step S15), calculates transmission weights from the training weights and the virtual transmission weights (step S16), transmits data in accordance with the transmission weights (step S 17), and ends communication. The access point 1 updates training weights for each station using the weight channel information fed back in step S14, adds additional training weights if $L_0 \geq 1$, and stores resulting weights as new training weights (step S18).

Figure 5:
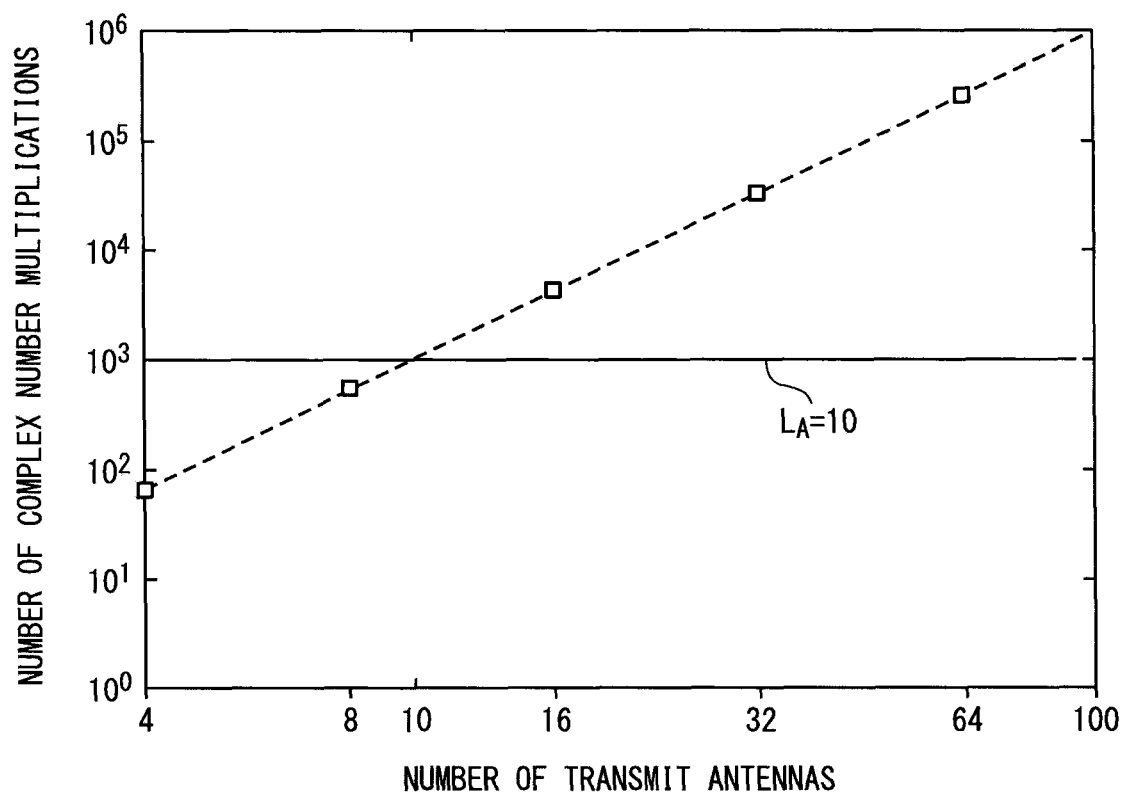
FIG. 5 is a diagram illustrating the number of complex number multiplications necessary for a transmission weight calculation in an access point.
Figure 6:
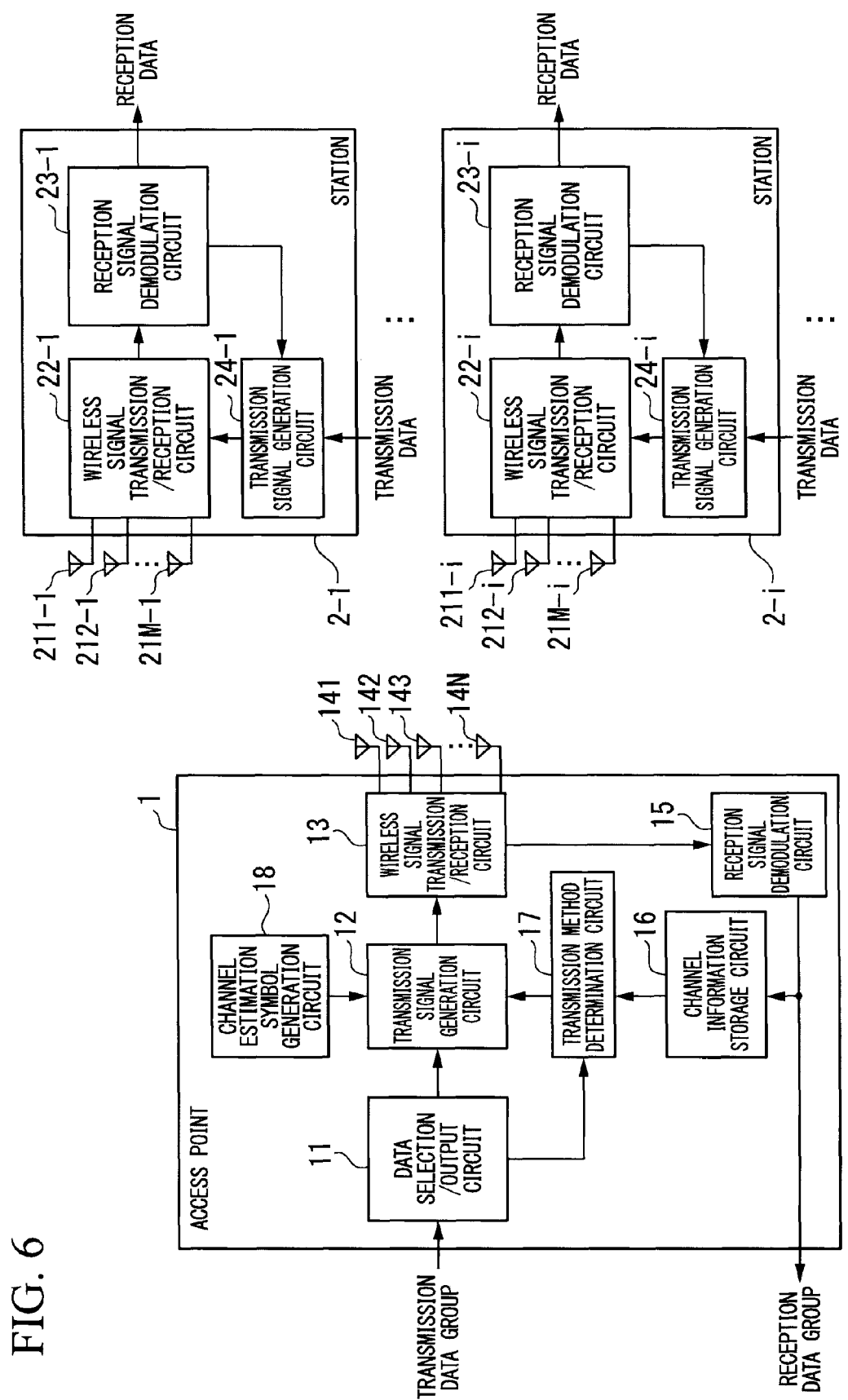
FIG. 6 is a block diagram illustrating a configuration of a transmission/reception system in accordance with the conventional art.
Figure 7:
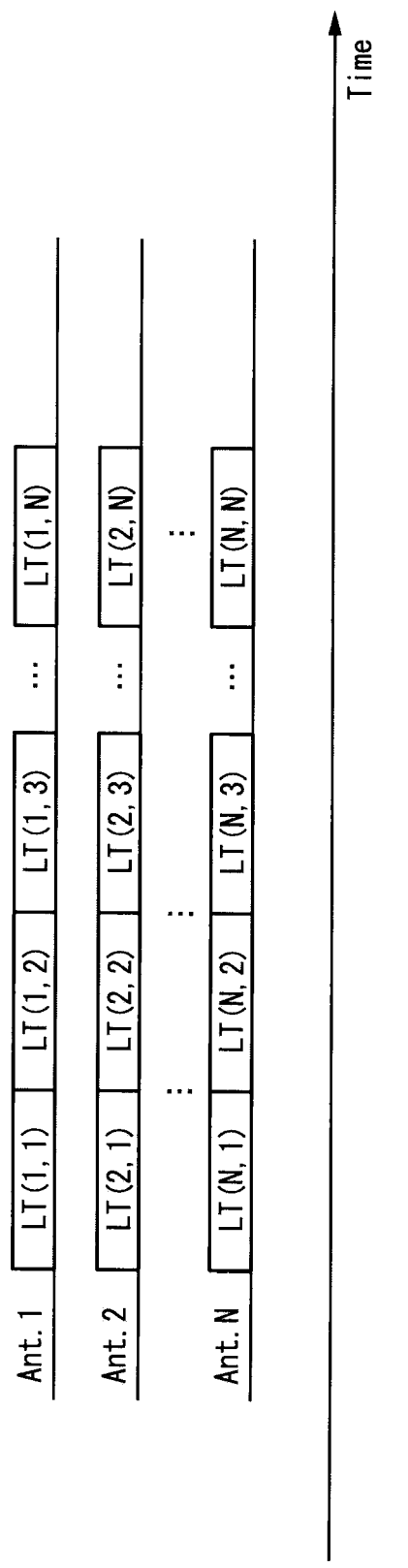
FIG. 7 is an explanatory diagram illustrating a configuration example of a training symbol.

Next, advantages of this embodiment will be described with reference to FIG. 5. FIG. 5 is a graph illustrating the number of complex number multiplications necessary for a transmission weight calculation in the access point 1. Although a computational load for calculating transmission weights also depends upon an algorithm and/or the number of receive antenna elements of a user, as a tendency, the computational load is proportional to a cubic order of the size of a channel matrix to be used in calculation, and the number of complex number multiplications in a computation of obtaining a right singular matrix of an (N×$M_t$) channel matrix also increases in a cubic order of N. The computation of FIG. 5 represents the tendency of the number of complex number multiplications for the number of antenna elements N. It can be seen that the computational load significantly increases when N increases.

In accordance with this embodiment, it is possible to decrease the number of column vectors of a channel matrix to the number of column vectors $L_A$ of the training weights by using the weight channel matrix rather than by estimating the channel matrix. For example, it can be seen that, because a computational load for calculating virtual transmission weights is determined in accordance with $L_A$ when communication is performed by setting $L_A$ to 10, an increase in the computational load can be prevented if the number of transmit antennas is greater than $L_A$, and the effect is particularly improved when the number of the transmit antennas increases. In addition, the time occupied by the training symbol as well as the computational load in the access point 1 can be reduced, a decrease in the throughput due to the overhead is prevented, an influence by time fluctuation of a propagation environment is decreased by reducing a time from the estimation of weight channel information to the feedback, and feedback information is also reduced from an N-dimensional vector to an $L_A$-dimensional vector, and thus it is possible to reduce the feedback information and contribute to an increase of a system throughput.

Although the embodiments of the present invention has been described above in detail with reference to the drawings, specific configurations are not limited to the above-described embodiments, and design or the like that does not depart from the gist of the present invention is also included.

As described above, multiuser MIMO is technology which realizes simultaneous communication at the same frequency among the access point and a plurality of stations by forming directivity using a plurality of antennas. However, because it is necessary for the transmission end to perform beamforming, it is necessary to acquire channel information between each transmit antenna and each receive antenna before transmission. Although it is general to use a training signal, which is a known signal, so as to acquire the channel information, there is a problem in that the length of a preamble increases and transmission efficiency is degraded with an increase in the number of antennas.

In this embodiment, channel information which is not used in transmission is not acquired, thereby reducing the length of the preamble. Specifically, when the number of channel dimensions necessary for transmission to the station 2-*i* is denoted as $L_i$, channel information corresponding to $L_i$ is acquired from each station and a preamble is transmitted using only an antenna corresponding to the channel information. Thereby, because the length of the preamble is equal to a sum of $L_1$ to $L_K$ (K is the number of stations), it is possible to reduce the length of the preamble compared to the conventional art. On the other hand, because the channel information is minimum information necessary for transmission, the transmission is performed by attaching a surplus training signal $L_0$ so as not to lose the flexibility of beamforming. The channel information corresponding to $L_0$ is not used in the transmission, and is used to update the channel information.

It is to be noted that the wireless communication process may be performed by recording a program for realizing the functions of the processing units in FIG. 1 on a computer-readable recording medium and causing a computer system to read and execute the program recorded on the recording medium. It is to be noted that the "computer system" used here is assumed to include an operating system (OS) and/or hardware such as peripheral devices. In addition, the "computer system" is also assumed to include a World Wide Web (WWW) system having a home page providing environment (or display environment). In addition, the "computer-readable recording medium" refers to a portable medium such as a flexible disk, a magneto-optical disc, a read only memory (ROM), a compact disc-ROM (CD-ROM), and a storage apparatus such as a hard disk embedded in the computer system. Furthermore, it is assumed that the "computer-readable recording medium" also includes a medium for storing a program for a given period of time like a volatile memory (random access memory (RAM)) inside a computer system serving as a server or a client when the program is transmitted via a network such as the Internet or a communication line such as a telephone line.

In addition, the above-described program may be transmitted from a computer system storing the program in a storage apparatus or the like to another computer system via a transmission medium or transmission waves of the transmission medium. Here, the "transmission medium" used to transmit the program refers to a medium having a function of transmitting information like a network (communication network) such as the Internet or a communication circuit (communication line) such as a telephone line. The above-described program may be used to realize part of the above-described functions. Furthermore, the program may be a so-called differential file (differential program) capable of realizing the above-described functions through combination with a program already recorded on the computer system.

INDUSTRIAL APPLICABILITY

It is possible to reduce an overhead of a channel estimation frame for a system, a feedback amount of channel-related information, and a time difference until the channel-related information is fed back by performing channel estimation in accordance with a training symbol using training weights. Therefore, the present invention can be applied for the purpose of indispensably realizing a communication system having a high system throughput.

DESCRIPTION OF REFERENCE SIGNS

1 Access point
2-1 to 2-$i$ Station
11 Data selection/output circuit
12, 24-1 to 24-$i$ Transmission signal generation circuit
13, 22-1 to 22-$i$ Wireless signal transmission/reception circuit
141 to 14N, 211-1 to 21M-1, 211-$i$ to 21M-$i$ Transmit/receive antenna
15, 23-1 to 23-$i$ Reception signal demodulation circuit
161 Weight channel information storage circuit
25-1 to 25-$i$ Channel estimation circuit
17 Transmission method determination circuit
18 Channel estimation symbol generation circuit
19 Training weight determination circuit

The invention claimed is:

1. A wireless communication method in which an access point apparatus including a plurality of antennas communicates with at least one station apparatus, the method comprising:
a training weight reading step of reading, by the access point apparatus, training weights for a station which performs channel estimation stored in a storage unit;
a weight training symbol transmission step of generating, by the access point apparatus, a weight training symbol by multiplying the training weights by a training symbol and transmitting the generated weight training symbol;
a weight channel information estimation step of estimating, by the station apparatus, weight channel information from the received weight training symbol;
a feedback step of transmitting, by the station apparatus, the weight channel information to the access point apparatus;
a transmission weight calculation step of calculating, by the access point apparatus, transmission weights using the received weight channel information and the training weights stored in the storage unit;
a data signal transmission step of transmitting, by the access point apparatus, a data signal in accordance with the transmission weights; and
a training weight storage step of calculating, by the access point apparatus, new training weights using the weight channel information and the training weights stored in the storage unit and storing the calculated new training weights in the storage unit.

2. The wireless communication method according to claim 1, wherein the training weight storage step includes storing, as the new training weights, training weights obtained by multiplying the weight channel information stored in each station apparatus or a signal space matrix obtained from the weight channel information by the training weights used in the weight training symbol.

3. The wireless communication method according to claim 1, wherein the weight training symbol transmission step includes applying an orthogonalization method to the training weights for the station which performs the channel estimation read in the training weight reading step, multiplying the training symbol by an obtained orthogonal vector as the training weights, and generating the weight training symbol.

4. The wireless communication method according to claim 1, wherein the training weight storage step includes storing the transmission weights calculated in the transmission weight calculation step as the new training weights.

5. The wireless communication method according to claim 1, wherein the training weight storage step includes setting additional training weights in addition to training weights defined for each station apparatus, adding different additional training weights to the read training weights every time the training weights are read, and using the read training weights and the additional training weights in calculation of the new training weights.

6. The wireless communication method according to claim 5, wherein the training weight storage step includes selecting a different vector from a pre-stored orthogonal code matrix every time and determining the selected vector as the additional training weights.

7. The wireless communication method according to claim 5, wherein the training weight storage step includes determining the number of vectors to be used as the additional training weights using any one of a delay time until data is transmitted after the training weights are stored, a magnitude of channel fluctuation of a propagation environment, and a difference between a reference value estimated from channel information estimated for a signal from the station apparatus in uplink communication and a reference value estimated from the weight channel information fed back in downlink communication.

8. An access point apparatus which includes a plurality of antennas and performs wireless communication with at least one station apparatus, the access point apparatus comprising:
a storage unit which stores training weights;
a training weight generation unit which generates a weight training symbol by reading the training weights for a station which performs channel estimation stored in the storage unit and multiplying the read training weights by a training symbol;
a transmission signal generation unit which generates a transmission packet to which the weight training symbol has been attached;
a wireless signal transmission/reception unit which converts the transmission packet into a frequency of a wireless section, transmits a resultant packet via an antenna, and receives a signal from the station apparatus via the antenna;
a weight channel information extraction unit which extracts weight channel information from the received signal;
a data transmission unit which calculates data signal transmission weights from the weight channel information and the training weights and outputs the calculated data signal transmission weights; and
a training weight calculation unit which calculates new training weights from the weight channel information and the training weights and writes the calculated new training weights to the storage unit.

9. The access point apparatus according to claim 8, wherein the training weight generation unit comprises an additional training vector candidate storage unit which stores a candidate vector for additional training weighs, reads different additional training weights every time the training weights are read, and attaches the read additional training weights to the read training weights.

10. The access point apparatus according to claim 8, wherein the training weight generation unit comprises a channel evaluation unit which estimates, as a channel evaluation value, any one of a delay time until data is transmitted after the training weights are stored, a magnitude of channel fluctuation of a propagation environment, and a difference between a reference value estimated from channel information estimated for a signal from the station apparatus in uplink communication and a reference value estimated from the weight channel information fed back in downlink communication, and determines the number of vectors to be used as the additional training weights in accordance with a magnitude of the channel evaluation value.

* * * * *